United States Patent [19]

Marcus et al.

[11] Patent Number: 5,007,458
[45] Date of Patent: Apr. 16, 1991

[54] POPPET DIAPHRAGM VALVE

[75] Inventors: Jerald J. Marcus, Otsego; John F. Berninger, Portage, both of Mich.

[73] Assignee: Parker Hannifin Corporation, Cleveland, Ohio

[21] Appl. No.: 514,913

[22] Filed: Apr. 23, 1990

[51] Int. Cl.$^5$ .................. F16K 31/06; F16K 11/02
[52] U.S. Cl. .................. 137/625.5; 251/129.17; 251/282
[58] Field of Search .............. 137/625.5; 251/129.17, 251/282

[56] References Cited

U.S. PATENT DOCUMENTS

| 3,329,165 | 7/1967 | Lang | 137/625.5 |
| 4,237,931 | 12/1980 | Rafaely | 137/625.5 |
| 4,711,269 | 12/1987 | Sule | 137/625.5 |

FOREIGN PATENT DOCUMENTS

| 3024435 | 1/1982 | Fed. Rep. of Germany | 251/129.17 |

Primary Examiner—Arnold Rosenthal
Attorney, Agent, or Firm—Ralph E. Jocke

[57] ABSTRACT

A solenoid actuated pneumatic valve (50) has a valve body (52). The valve includes an inlet (60), a first outlet (62) and a second outlet (64). The body has a first internal chamber (66) and a second internal chamber (68). The first and second chambers are connected through a first opening (80). The body also includes a third chamber (76) connected to the first chamber through a second fluid opening (84). A stem (88) extends through the first, second and third chambers and is coaxial with the first and second fluid openings. A first poppet diaphragm (112) is mounted on the stem in the second chamber. The poppet diaphragm includes a face (118) sized for blocking the first opening, and a convoluted web portion (120) which extends radially outward and attaches to the valve body. A second poppet diaphragm (130) is mounted on the stem in the third chamber. The second diaphragm has a face sized for blocking the fluid opening between the first and third chambers. An electric solenoid (108) moves the stem in response to changes in electrical condition. In a first condition, the first poppet diaphragm is disposed of the opening between the first and second chambers. Compressed air passes from the inlet to the first outlet while the second poppet diaphragm blocks the delivery of air to the second outlet. Changing the condition of the electric solenoid moves the stem so that the first poppet diaphragm blocks delivery of air to the first outlet and compressed air is directed to the second outlet.

13 Claims, 3 Drawing Sheets

POPPET DIAPHRAGM VALVE

TECHNICAL FIELD

This invention relates to valves that are used to control the flow of fluid. Specifically, this invention relates to valves which are used to control the directional flow of compressed air.

BACKGROUND ART

Many types of valves have been used for controlling the flow of fluids. Prior pneumatic valves that are used to direct the flow of compressed air have been of the conventional poppet/orifice or spool/sleeve types. These valves are typically actuated by electrical solenoids, remote air pilot signals or manual mechanical means.

Another type of prior art pneumatic valve of which Applicants are aware is shown in FIG. 1. This prior art valve has a body which includes a cylindrical first chamber 10 which is in communication with a supply of compressed air. First chamber 10 is in communication with an enlarged second chamber 14 through an opening 12. Second chamber 14 is bounded by a generally circular diaphragm 16 of resilient material. Second chamber 14 also includes a first fluid outlet from the valve body which is not shown. Diaphragm 16 is held at its outer diameter between a central portion 18 and a head portion 20 of the valve body. An inner portion of the diaphragm 16 includes a hole (not separately shown) through which a stem piece 22 extends. Stem piece 22 has an enlarged head 24, a tapered step 26 and an inner portion 27. An inner portion of diaphragm 16 adjacent the hole, is in abutting relation with tapered step 26 to form a fluid tight seal.

A seal carrier 28 is mounted on stem 22 adjacent the tapered step. Diaphragm 16 is held between seal carrier 28 and head 24 of the stem. A circular seal 30 is mounted on the seal carrier. In FIG. 1, seal 30 is shown disposed from opening 12. However, as later explained, the seal is movable with the stem into contact with the opening to block the flow of compressed air therethrough. A sleeve 32 is positioned in the first chamber and accepts the inner portion 27 of stem 22. Sleeve 32 also accepts an inner portion of a second stem 34 which is mounted in the sleeve in an opposed position. Sleeve 32 and stems 22 and 34 are held together by a press fit. Stem 34 carries an assembly 36 comprised of a diaphragm, seal carrier and seal similar to that already described. Assembly 36 is positioned adjacent a second opening 35 which is in fluid communication with first chamber 10.

Assembly 36 is positioned in a second chamber 37 in the valve body. Second chamber 37 has a second fluid outlet (not shown) to deliver compressed air out of the valve body. A second seal 38 is mounted on assembly 36. Second seal 38 is positioned adjacent second opening 35. Stems 22 and 34 are arranged so that when seal 30 is disposed of opening 12 as shown in FIG. 1, seal 38 is adjacent and blocking second opening 35. Likewise when the stems are moved so that seal 38 is disposed of second opening 35, seal 30 is adjacent and blocking opening 12.

An armature assembly 40 and electrical solenoid 41 are mounted on the valve body and are used to move the stem and sleeve assembly longitudinally against the force of a biasing spring 42. Changing the electrical condition of solenoid 41 moves the stem and sleeve assembly so that compressed air from the first chamber is selectively delivered to either the second chamber 14 or to the third chamber 37.

The prior art valve shown in FIG. 1 presents an advantage over other types pneumatic valves in that it has a pressure balanced stem assembly, which minimizes solenoid force requirements. However, it has several disadvantages. It has many moving parts that must be press fit together which make it expensive to produce. It also has the disadvantage that the parts require close tolerances for control of the flow openings and for control of the magnetic field created by the solenoid.

Thus there exists a need for an improved valve that is simpler in design, more reliable and less expensive to produce.

SUMMARY OF THE INVENTION

It is an object of the present invention to provide a poppet diaphragm valve that is more reliable.

It is a further object of the present invention to provide a poppet diaphragm valve that is simple in design.

It is a further object of the present invention to provide a poppet diaphragm valve that is less expensive to produce and manufacture.

Further objects of the present invention will be made apparent in the following Best Mode for Carrying Out Invention and the appended claims.

The foregoing objects are accomplished in the preferred form of the invention by a valve for directing the flow of compressed air which includes a body. The body has a fluid inlet and at least one outlet. The inlet is open to a first chamber within the body. The body also includes a second fluid chamber, the second chamber being in communication with an outlet. The first and second chambers are connected through a fluid opening which extends from the first chamber and opens into a first side of the second chamber. The second chamber also has a second side opposite the first side.

A stem extends through the body of the valve and is coaxial with the fluid opening between the first and second chambers. The stem is movable in the longitudinal direction. An electrical solenoid mounted on the valve is connected to the stem to provide selective movement thereof.

A poppet diaphragm is mounted on the stem in the second chamber and moves with the stem. The poppet diaphragm is of unitary construction and is made of resilient material. The poppet diaphragm includes a first body portion which includes a face adjacent the fluid opening between the first and second chambers. The face of the poppet diaphragm is sized to block the fluid opening when the face is pushed against the opening. The poppet diaphragm also includes a web portion disposed from the face. The web portion extends outward in a convoluted shape and terminates in a turned peripheral portion. The peripheral portion of the web is engaged to the body of the valve in fluid tight relation. As the poppet diaphragm is of unitary construction and imperforate, it forms a closure for the second chamber.

In operation, compressed air or other fluid is delivered to the first chamber of the valve from the inlet. When the electrical condition of the solenoid is such that the face of the poppet diaphragm is disposed from the fluid opening between the first and second chambers, compressed air flows into the second chamber and is delivered to the outlet therefrom. When the electrical condition of the solenoid is changed, the stem moves to bring the face of the poppet diaphragm against the fluid opening between the first and second chambers. This stops the flow of fluid through the valve.

BEST MODE FOR CARRYING OUT INVENTION

Figure 1:
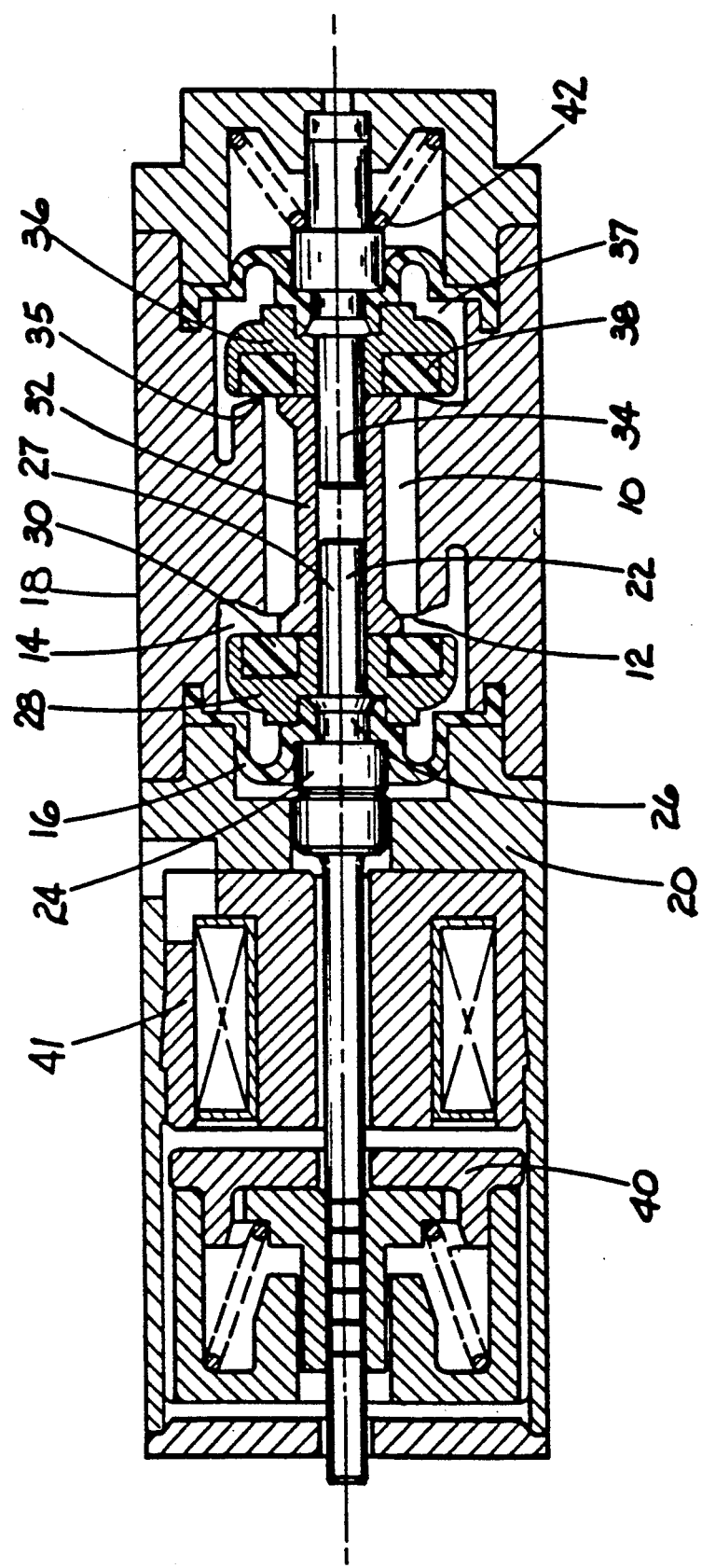
FIG. 1 is a cross sectional view of a prior art valve.
Figure 2:
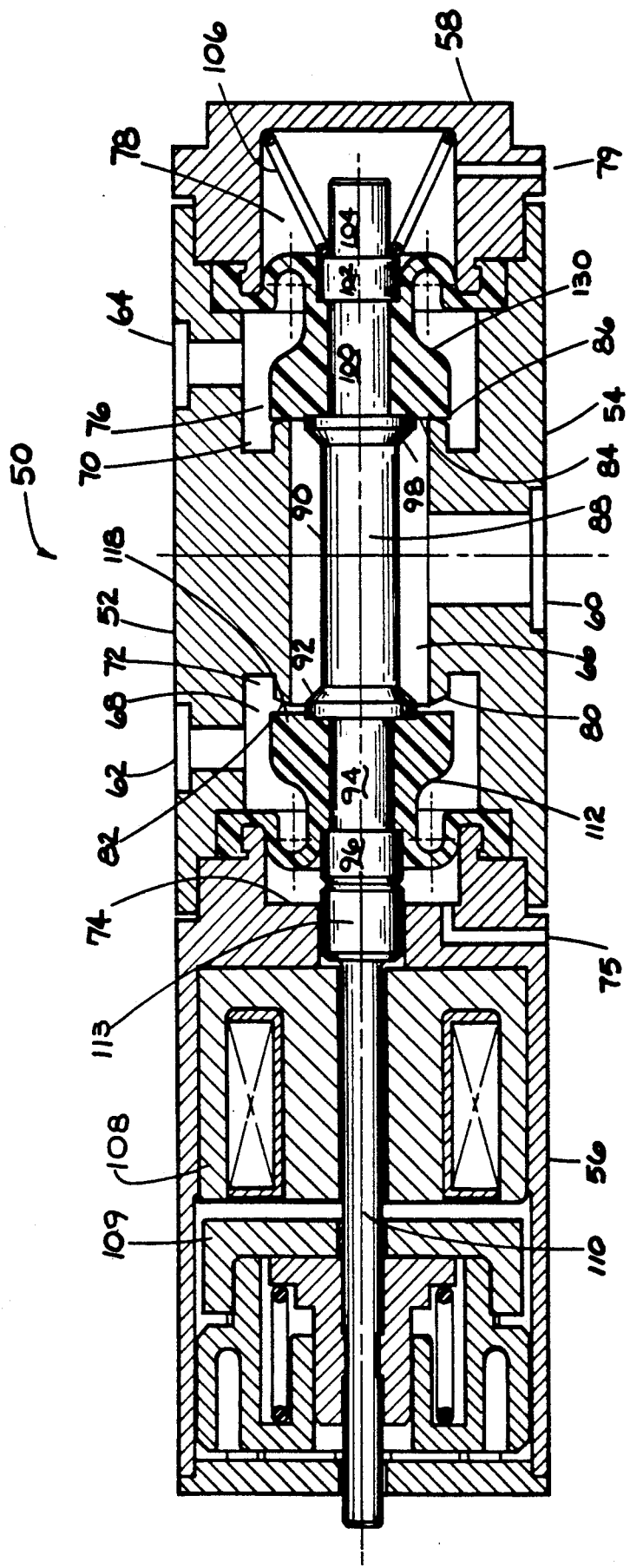
FIG. 2 is a cross sectional view of the preferred embodiment of the valve of the present invention.

Referring now to the drawings and particularly to FIG. 2, there is shown therein a preferred form of the poppet diaphragm valve of the present invention generally indicated 50. Valve 50 has a body 52 which includes a central portion 54, an operator portion 56 and a return cap 58. These parts of the valve are held together by fastening means (not shown). Body 52 includes an inlet 60 to which a supply of compressed air or other fluid is connected. Body 52 also has a first outlet 62 and a second outlet 64.

Body 52 includes a first internal fluid chamber 66 which is in fluid communication with inlet 60. A second chamber 68 in body 52 is in fluid communication with first outlet 62. A third chamber 70 is in fluid communication with second outlet 64. Second chamber 68 has a first side 72 and a second side 74 which are bounded by walls of the central portion and the operator portion of the body respectively. Second side 74 serves as an open portion of chamber 68 as it is open to atmosphere through a passage 75. Third chamber 70 has a third side 76 and a fourth side 78 bounded by walls of the central portion and return cap of the body respectively. Fourth side 78 is also open to atmosphere through a passage 79.

A first fluid opening 80 extends between the first chamber 66 and the second chamber 68. The first fluid opening is circular and is surrounded by a first tapered seat 82. A similarly sized second fluid opening 84 extends between the first and third chambers. Second fluid opening 84 is bounded by a second tapered seat 86. First fluid opening 80 and second fluid opening 84 are coaxial.

A stem 88 extends through the first and second fluid openings 80 and 84 respectively. Stem 88 is mounted for longitudinal movement in the valve body. Stem 88 is cylindrical and has an enlarged central section 90. Central section 90 is bounded by a first tapered step 92. Stem 88 also includes a first reduced portion 94 and a head 96. At an opposed end, stem 88 also has a second tapered step 98, a second reduced portion 100, a third step 102 and an extension 104. A conical compression spring 106 is housed in return cap 58 of the valve and serves to bias stem 88 by applying force to third step 102. Spring 106 biases stem 88 to the left as shown in FIG. 2.

An electrical solenoid 108 and an armature 109 are mounted in the operator portion 56 of the valve body 52. Solenoid 108 includes a push pin 110 which is moveable in response to changes in the electrical condition of the solenoid. The push pin 110 has an enlarged head 113 which abuts head 96 of stem 88. Push pin 110 is operative to move stem 88 against the biasing force of spring 106.

Figure 4:
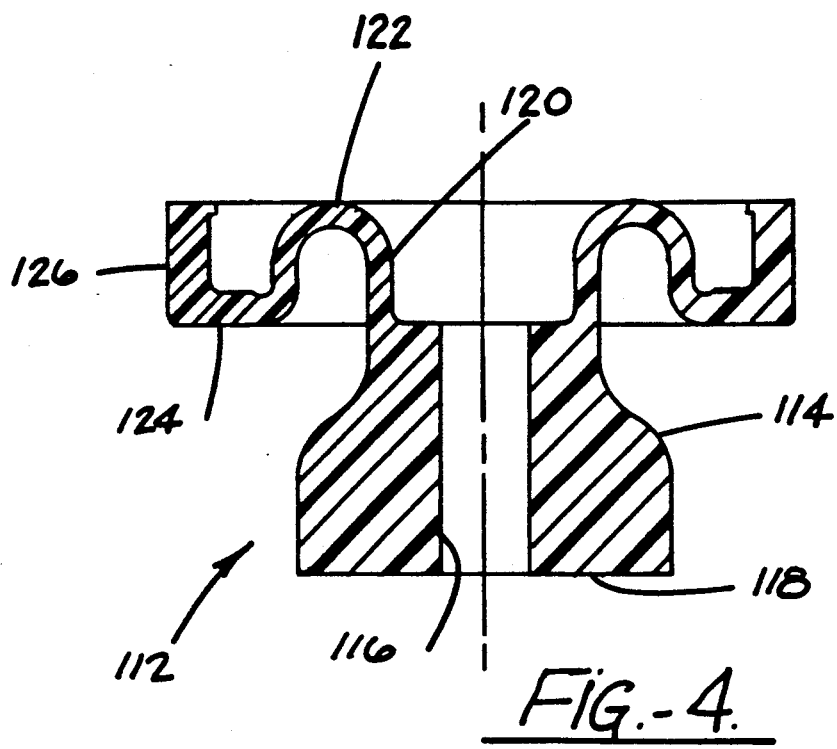
FIG. 4 is a cross sectional view of the poppet diaphragm shown in FIG. 3.
Figure 3:
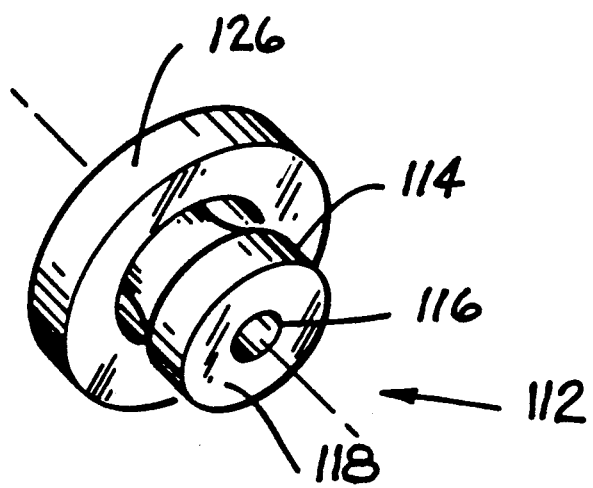
FIG. 3 is an isometric view of a poppet diaphragm of the valve shown in FIG. 2.

A first poppet diaphragm 112 is mounted on stem 88 and is positioned in first chamber 68. As shown in FIGS. 3 and 4, poppet diaphragm 112 has a body portion 114 of resilient material through which a hole 116 extends. Hole 116 enables the poppet diaphragm to be pressed on to stem 88 and fit snugly thereon to prevent air from passing between the poppet diaphragm and the stem. Body 114 is enlarged at a first end and terminates in a flat face 118. Face 118 is sized for blocking first opening 80 and seating on first seat 82.

Disposed of face 118 on poppet diaphragm 112 is a web portion 120. Web portion 120 is thin walled in cross section and includes a convoluted fold 122. Convoluted fold 122 extends around the web portion 120. Web 120 terminates in a peripheral portion 124. Peripheral portion 124 includes a lip 126 which extends longitudinally parallel to hole 116.

Poppet diaphragm 112 is of imperforate, unitary construction. It is made of flexible resilient material so that the convoluted fold may flex and extend as the stem 88 moves. In the preferred embodiment of the invention, the poppet diaphragm is made from an elastomer. This enables the poppet seal to be readily pressed onto the stem for ease of assembly.

As shown in FIG. 2, lip 126 is located in the peripheral portion of the poppet diaphragm and is held between the central portion 54 and the operator portion 56 of the valve body. This construction ensures that air may pass only from the first side 72 of chamber 68 to the outlet from the chamber.

A second poppet diaphragm 130 is mounted on stem 88 in the third chamber 70. Poppet diaphragm 130 is identical to poppet diaphragm 112 and its peripheral portion is held between the central portion 54 and the return cap 58 of the valve body.

In operation with the solenoid 108 in a first electrical condition, spring 106 biases stem 88 to the position shown in FIG. 2. In this first condition, the face of poppet diaphragm 112 is disposed of seat 82 and fluid supplied at inlet 60 passes from the first chamber 66, through the first fluid opening 80, through the second chamber 68 and out of the valve through first outlet 62. No fluid flows from the second outlet 64 in this first condition because the face of poppet diaphragm 130 blocks the passage of fluid through second fluid opening 84.

When the electrical condition of solenoid 108 is changed, push pin 110 moves stem 88 to the right of the position shown in FIG. 2. The stem moves to the right until face 118 of poppet diaphragm 112 blocks first opening 80. In this second condition, the face of poppet diaphragm 130 is disposed of second seat 86 and second fluid opening 84 is open. This causes fluid to be directed from the inlet 60 to second outlet 64. Of course, in this second condition no fluid flows from first outlet 62.

The valve shown in FIG. 2 is balanced by sizing the convoluted folds of the webs of the poppet diaphragms 112 and 130 so they have an effective diameter that is equal to the sealing point diameter of the first and second fluid openings 80 and 84. The pressure of the fluid in the valve applies force to the web of the poppet diaphragm in the chamber through which the fluid is directed to flow. This force is transmitted by the stem and helps to hold the opposed poppet diaphragm against its seat and in the closed position. This balances the force of fluid pressure against the face of the closed poppet diaphragm and reduces the force that must be applied by the solenoid or spring to hold the valve in a given condition. As will be apparent to those skilled in the art, by changing the relative sizes of the convoluted portions of the webs and fluid openings, the stem of the valve can be biased or balanced in various ways to suit the needs in other applications.

Thus the new poppet diaphragm valve achieves the above stated objectives, eliminates difficulties encountered in the use of prior art devices, solves problems and obtains the desirable results described herein.

In the foregoing description, certain items have been used for brevity, clarity and understanding, however no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is constructed and operated and the advantages and useful results obtained, the new and useful structures, devices, elements, arrangements, parts, combination, systems, equipment, operations and relationships are set forth in the appended claims.

We claim:

1. A fluid valve for directing fluid flow therethrough, comprising:
   a valve body;
   said body including:
      a first chamber;
      first inlet means for introducing fluid into said first chamber;
      a second chamber, said second chamber having a first side and an opposed second side;
      first outlet means for delivering fluid from said first side of said second chamber;
      first fluid passage means extending between said first and second chambers, said first fluid passage means including a first opening into said first side of said second chamber;
   a stem mounted for axial movement on said valve body, said stem movable between a first position and a second position, said stem including a first reduced portion;
   movement means for selectively moving said stem between said first and second positions;
   a first poppet diaphragm mounted on said stem for movement therewith in said second chamber, said poppet diaphragm including:
      a first resilient body portion, said first body portion including a first hole therethrough, said first reduced portion of said stem extending through said first hole, said first body portion adjacent said stem abutting said first reduced portion whereby said first body portion is fixed on said stem; said first body portion further having a first face adjacent said first opening, said first face adapted for blocking said first opening when said stem is in the first position, and said first face disposed of said first opening when said stem is in the second position;
      a flexible first web portion, said web portion extending outward of said first body portion to first peripheral portions, said first peripheral portions of said web engaging said valve body, said first poppet diaphragm maintaining said first side of said second chamber in fluid tight relation with said first opening and said first outlet means;
   whereby movement of said stem between said first and second positions selectively places said first inlet and first outlet in fluid communication.

2. The valve according to claim 1 wherein said first fluid passage means is coaxial with said stem, said first fluid opening is a first aperture, said stem extends through said first aperture and said first face of said first poppet diaphragm is a circular face sized for blocking said aperture when the stem is in the first position.

3. The valve according to claim 2 wherein said first web portion includes a convoluted fold.

4. The valve according to claim 1 and further comprising:
   a third chamber in said valve body, said third chamber having a third side and a fourth side, said stem extending through said third chamber and including a second reduced portion therein;
   second outlet means for delivering fluid from said third side of said third chamber;
   second fluid passage means between said first and third chambers, said second fluid passage means including a second opening in said third side of said third chamber;
   a second poppet diaphragm mounted on said stem for movement therewith in said third chamber, said poppet diaphragm including:
      a second resilient body portion, said second body portion including a second hole therethrough, said second reduced portion of said stem extending through said second hole, said second body portion adjacent said stem abutting said second reduced portion whereby said second body portion is fixed on said stem; said second body portion further having a second face adjacent said second opening, said second face adapted for blocking said second opening when the stem is in the second position, and said second face disposed of said opening when the stem is in the first position;
      a second flexible web portion, said second web portion extending outward of said second body portion to second peripheral portions, said second peripheral portions engaging said valve body, said second poppet diaphragm maintaining said third side of said third chamber in fluid tight relation with said second opening and said second outlet means;
   whereby movement of the stem between the first and second positions selectively places said fluid inlet means in fluid communication with said first and second fluid outlet means.

5. The valve according to claim 4 wherein said first and second fluid passage means are coaxial with said stem and said first opening is a first aperture and said second opening is a second aperture, said stem extending through said first and second apertures; said first face of said first body portion is a circular face sized for blocking said first aperture when said stem is in the first position; and said second face of said second body portion is a circular face sized for blocking said second aperture when said stem is in the second position.

6. The valve according to claim 5 wherein said first and second web portions include convoluted folds.

7. The valve according to claim 6 and further comprising biasing means for biasing said stem toward said first position, and wherein said movement means moves said stem against the force of said biasing means.

8. The valve according to claim 7 wherein said movement means for said stem is an electrical solenoid.

9. The valve according to claim 8 wherein said biasing means is a spring positioned on said fourth side of said third chamber.

10. A fluid valve for directing fluid flow therethrough, comprising:
a valve body;
said body including:
a first chamber;
first inlet means for introducing fluid into said first chamber;
a second chamber, said second chamber including an open portion;
first outlet means for delivering fluid from said second chamber;
first fluid passage means extending between said first and second chamber, said first fluid passage means including a first opening into said second chamber;
a stem mounted for axial movement on said valve body, said stem movable between a first position and a second position and including an enlarged head portion thereon;
movement means for selectively moving said stem between said first and second positions;
a first poppet diaphragm mounted on said stem for movement therewith in said second chamber, said poppet diaphragm including:
a first body portion, said first body portion having a first face adjacent said first opening, said first face adapted for blocking said first opening when said stem is in the first position, and said first face disposed of said first opening when said stem is in the second position;
a flexible resilient first web portion, said web portion extending radially outward from a first area of said first body portion and closing said open portion of said second chamber, said first poppet diaphragm maintaining said first side of said second chamber in fluid tight relation with said first opening and said first outlet means, said first area comprised of resilient material and said first web portion including a convoluted fold, said enlarged head portion of said stem underlying said first area of said body;
whereby movement of said stem between said first and second positions selectively places said first inlet and first outlet in fluid communication.

11. The apparatus according to claim 5 wherein said first aperture has a first sealing point diameter and said second aperture has a second sealing point diameter, and wherein said first web portion has a first effective diameter equal to said second sealing point diameter and said second web portion has a second effective diameter equal to said first sealing point diameter.

12. The apparatus according to claim 11 wherein said first web portion includes a first convoluted fold and said second web portion includes a second convoluted fold.

13. A fluid valve for selectively directing fluid flow from an inlet to a first outlet and alternatively to a second outlet, comprising:
a valve body,
said body including a first chamber in fluid communication with the inlet, a second chamber in fluid communication with the first outlet, and a third chamber in fluid communication with the second outlet;
said body further including a first aperture for passing fluid from said first chamber to said second chamber, said first aperture having a first sealing point diameter; said body further including a second aperture for passing fluid from said first chamber to said third chamber, said second aperture having a second sealing point diameter;
a stem mounted for axial movement on said valve body said stem extending through said first and second apertures, said stem moveable between a first position and a second position;
movement means for selectively moving said stem between said first and second positions;
a first poppet diaphragm mounted on said stem for movement therewith in said second chamber, said first poppet diaphragm including a first resilient body portion and having a first face adapted for blocking said first aperture when said first face is adjacent said first aperture in the first portion of the stem;
said first poppet diaphragm further comprising a flexible first web portion extending radially outward from said first body portion to first peripheral portions, said first peripheral portions in fluid tight relation with said body, said web portion further including a first convoluted, half circular fold extending between said first body portion and said first peripheral portions, said first fold having a first circular centerline having a first centerline diameter, the first centerline diameter equal to said second sealing point diameter;
a second poppet diaphragm mounted on said stem for movement therewith in said third chamber, said second poppet diaphragm including a second resilient body portion and having a second face adapted for blocking said second aperture when said second face is adjacent the second aperture in the second portion of the stem;
said second poppet diaphragm further comprising a flexible second web portion extending radially outward from said second body portion to second peripheral portions, said second peripheral portions in fluid tight relation with said body, said second web portion further including a second convoluted, half circular fold extending between said second body portion and said second peripheral portions, said fold having a second circular centerline having a second centerline diameter, the second centerline diameter equal to said first sealing point diameter;
whereby movement of said stem between said first and second positions selectively places said inlet and said first outlet and second outlet alternatively in fluid communication.

* * * * *